United States Patent
Schwartz et al.

(10) Patent No.: US 10,782,237 B2
(45) Date of Patent: Sep. 22, 2020

(54) OPTICAL DETECTION OF TRACER GASES IN A GAS DISCHARGE CELL HAVING UNEXPOSED ELECTRODES

(71) Applicant: INFICON GmbH, Bad Ragaz (CH)

(72) Inventors: Vladimir Schwartz, Lexington, MA (US); Boris Chernodbrod, Redwood City, CA (US)

(73) Assignee: INFICON Holding AG, Bad Ragaz (CH)

( * ) Notice: Subject to any disclaimer, the term of this patent is extended or adjusted under 35 U.S.C. 154(b) by 247 days.

(21) Appl. No.: 15/768,351

(22) PCT Filed: Oct. 14, 2016

(86) PCT No.: PCT/EP2016/074743
§ 371 (c)(1),
(2) Date: Apr. 13, 2018

(87) PCT Pub. No.: WO2017/064265
PCT Pub. Date: Apr. 20, 2017

(65) Prior Publication Data
US 2018/0313763 A1    Nov. 1, 2018

Related U.S. Application Data

(60) Provisional application No. 62/284,980, filed on Oct. 16, 2015.

(51) Int. Cl.
*G01N 21/67*    (2006.01)
*G01N 21/68*    (2006.01)
(Continued)

(52) U.S. Cl.
CPC .............. *G01N 21/67* (2013.01); *G01M 3/20* (2013.01); *G01M 3/202* (2013.01); *G01M 3/226* (2013.01);
(Continued)

(58) Field of Classification Search
CPC .... G01N 21/67; G01N 21/3103; G01N 21/68; G01N 2021/3125; G01M 3/20; H05H 1/10; H05H 2001/245
See application file for complete search history.

(56) References Cited

U.S. PATENT DOCUMENTS

| 5,656,556 A | 8/1997 | Yang |
| 6,277,177 B1 | 8/2001 | Bley et al. |

(Continued)

FOREIGN PATENT DOCUMENTS

| CN | 101865832 A | 10/2010 |
| CN | 103149195 A | 6/2013 |

(Continued)

OTHER PUBLICATIONS

Karnik et al., Towards a Palladium Micro-Membrane for the Water Gas Shift Reaction: Microfabrication Approach and Hydrogen Purification Results, Journal of Microelectromechanical Systems, Feb. 2003, pp. 93-100, vol. 12:1, Institute of Electrical and Electronics Engineers.

(Continued)

*Primary Examiner* — Maurice C Smith
(74) *Attorney, Agent, or Firm* — The Webb Law Firm

(57) ABSTRACT

Tracer gas sensing device comprising a gas discharge cell having cell walls defining a discharge volume and a tracer gas inlet into the discharge volume, an optical spectrometer arrangement having a radiation source on a first side of the discharge cell for emitting radiation into the discharge cell and a radiation detector on a second side of the discharge cell opposite to the first side for detecting radiation which was emitted by the radiation source through the discharge volume, and electrodes on opposing sides of the discharge cell for generating a plasma within the discharge cell, said electrodes being unexposed plasma electrodes. The dis- (Continued)

charge cell may be a dielectric barrier discharge cell and the electrodes may be powered by an AC power source.

17 Claims, 7 Drawing Sheets

(51) Int. Cl.
    *G01M 3/22*     (2006.01)
    *H05H 1/24*     (2006.01)
    *G01N 21/31*     (2006.01)
    *G01M 3/20*     (2006.01)
    *H05H 1/10*     (2006.01)

(52) U.S. Cl.
    CPC .......... *G01N 21/3103* (2013.01); *G01N 21/68* (2013.01); *H05H 1/10* (2013.01); *H05H 1/2406* (2013.01); *G01N 2021/3125* (2013.01); *H05H 2001/2456* (2013.01)

(56) References Cited

U.S. PATENT DOCUMENTS

| | | | |
|---|---|---|---|
| 2005/0173375 A1* | 8/2005 | Mitrovic | H01J 37/32935 216/60 |
| 2008/0014653 A1* | 1/2008 | Bloom | G01J 3/443 436/171 |
| 2009/0151429 A1 | 6/2009 | Jun et al. | |
| 2011/0222058 A1* | 9/2011 | Kim | G01J 3/443 356/316 |
| 2011/0247400 A1 | 10/2011 | Schwartz et al. | |
| 2011/0247401 A1 | 10/2011 | Schwartz et al. | |
| 2011/0247498 A1 | 10/2011 | Schwartz et al. | |
| 2011/0290006 A1 | 12/2011 | Perkins et al. | |
| 2013/0148117 A1* | 6/2013 | Kulkarni | G01N 21/67 356/313 |
| 2013/0161507 A1* | 6/2013 | Nishimura | H01J 49/105 250/282 |
| 2013/0321804 A1* | 12/2013 | Kulkarni | G01J 3/443 356/316 |
| 2014/0262029 A1* | 9/2014 | Asakura | G01J 3/443 156/345.24 |
| 2015/0226673 A1* | 8/2015 | Motto-Ros | G01N 21/718 356/318 |
| 2015/0318220 A1* | 11/2015 | Kobayashi | H01L 21/67253 438/16 |

FOREIGN PATENT DOCUMENTS

| | | |
|---|---|---|
| CN | 102519938 B | 6/2014 |
| JP | 2001093059 A | 6/2001 |

OTHER PUBLICATIONS

Milosavljevic et al., Real Time Sensor for Monitoring Oxygen in Radio-Frequency Plasma Applications, Optics Express, Oct. 8, 2007, pp. 13913-13923, vol. 15:21, Optical Society of America.

* cited by examiner

OPTICAL DETECTION OF TRACER GASES IN A GAS DISCHARGE CELL HAVING UNEXPOSED ELECTRODES

CROSS-REFERENCE TO RELATED APPLICATIONS

This application is the United States national phase of International Application No. PCT/EP2016/074743 filed Oct. 14, 2016, and claims the benefit of U.S. Provisional Patent Application No. 62/284,980 filed Oct. 16, 2015, the disclosures of which are hereby incorporated in their entirety by reference.

BACKGROUND OF THE INVENTION

Field of the Invention

The invention refers to optical tracer gas detection and, in particular, to a device and method for optical detection of trace and tracer gases in a gas discharge cell.

Devices and instruments for leak detection and for sensing of trace and tracer gases, address technological requirements of diverse industries, such as vacuum, food, petrochemical, medical, pharmaceutical, nuclear or transportation.

Optical gas sensors which utilize principles of optical absorption spectroscopy are known. A laser beam at a pre-selected wavelength propagates through a plasma cell volume filled with a buffer gas. The laser beam may be a single path beam or a multipath beam. The buffer gas may be a single component gas or a gas mixture of multiple components, such as argon, helium, nitrogen, etc. An optical detector registers radiation and gas interactions within the plasma cell volume as an indication of trace/tracer gas molecules and their concentration.

SUMMARY OF THE INVENTION

In preferred and non-limiting embodiments, provided is a discharge cell that has outer cell walls surrounding a gas discharge volume. The discharge cell comprises a tracer gas inlet through which the tracer gas is introduced into the discharge volume. An optical spectrometer arrangement is employed for measuring of radiation absorption or a refractive index in any of its modalities within the discharge cell. On one side of the discharge cell, a radiation source is located for emitting radiation into and through the gas discharge volume. On an opposite side of the discharge cell, a radiation detector is located for detecting the radiation from the radiation source when it has travelled through the discharge volume.

The invention is based on the idea of employing unexposed plasma electrodes for generating the plasma within the discharge cell. "Unexposed" means that the electrodes are not directly exposed to the gas or gas mixture within the discharge cell. Rather, the electrodes are separated from the gas discharge volume by a material, such as an electrically insulating material which may be glass or other type of dielectric barrier. Inductive coupling, microwave or radio frequency may also be employed to separate the electrodes from the gas within the discharge cell. A dielectric barrier discharge plasma cell is particularly preferable due to its low complexity and low costs.

The tracer gas inlet of the discharge cell may comprise a gas selective membrane which is selective to the respective tracer gas or tracer gas components. The membrane may comprise a heat activated section or member to enable controllable inflow and/or outflow of tracer gas. The heat activated section can be achieved by a layer of thermally densified spin-on glass dielectric (SOG) leveled and/or capped with a thermally re-flown layer of chemical vapor deposited (CVD) borophosphosilicate glass (BPSG). The membrane may be thermally activated to facilitate controllable flow-through of gases.

Alternatively, the invention may be directed to a method for separating a gas component from a gas volume or from a flow of gas, by employing a spin-on glass (SOG) wafer as a gas selective membrane for separating the gas component. The gas volume may be static or moving and may be unbounded (free) or encapsulated surrounded by a housing or pipe. The wafer may be a silica oxide semiconductor. The membrane may be adapted and/or employed according to the above and/or below description.

The radiation source may be a laser diode, a radiation emitting diode or any other radiation source with emission characteristics in the required spectral range.

Preferably, the discharge cell volume has small inner dimensions defining the discharge volume. In particular, the cross section of the discharge volume in a plane lateral with respect to the direction of the radiation beam traveling from the radiation source through the discharge volume to the radiation detector, may have a width of less than 3 mm and preferably in the range between 0.3 and 1 mm, such that the discharge cell forms a small discharge gap.

The discharge cell may be a static cell filled with a buffer gas. Alternatively, the discharge cell may be a flow-through cell having a buffer gas inlet connected to a buffer gas source, and a buffer gas outlet which may be connected to a pump, such as a rotary vane pump.

Preferably, the tracer gas may be excited to an energetically higher state for detection in the excited state. The excited state can be a non-metastable state. The tracer gas may obtain its excited state due to interactions with excited states of a buffer gas or plasma electrons.

The device of the invention may be employed as a tracer gas monitor, a tracer gas leak detector or a tracer gas leak sniffer.

The density of plasma electrons can be increased with electrons emitted from at least one dielectric selectively deposited on a cell wall. The dielectric may be magnesium oxide or another similar material characterized by a high rate of secondary electron emission and/or by photo electrons generated by UV radiation from externally placed sources.

The sensing device may particularly be utilized as a helium, hydrogen or neon leak sniffer, where the plasma gas mixture within the discharge cell consists of or comprises ambient helium and neon, argon, nitrogen or oxygen or their proportional mixtures.

The device may be utilized as a helium, hydrogen, neon, nitrogen or oxygen leak detector, where the tracer gas can be a purified mixture or comprise components of ambient air, and where the plasma gas mixture comprises refillable and/or pressure-maintained gases such as helium, hydrogen, neon, argon, nitrogen or oxygen or their proportional mixtures.

An additional light radiation source may be employed to quantify the influence or influences of background gas components within the discharge cell on critical plasma parameters.

Behind each electrode, i.e. opposite to the discharge cell, at least one magnet may be positioned in order to minimize or reduce losses of plasma electrons on the cell walls.

BRIEF DESCRIPTION OF THE DRAWINGS

In the following, embodiments of the invention are described with reference to the Figures.

DESCRIPTION OF THE INVENTION

Figure 1:
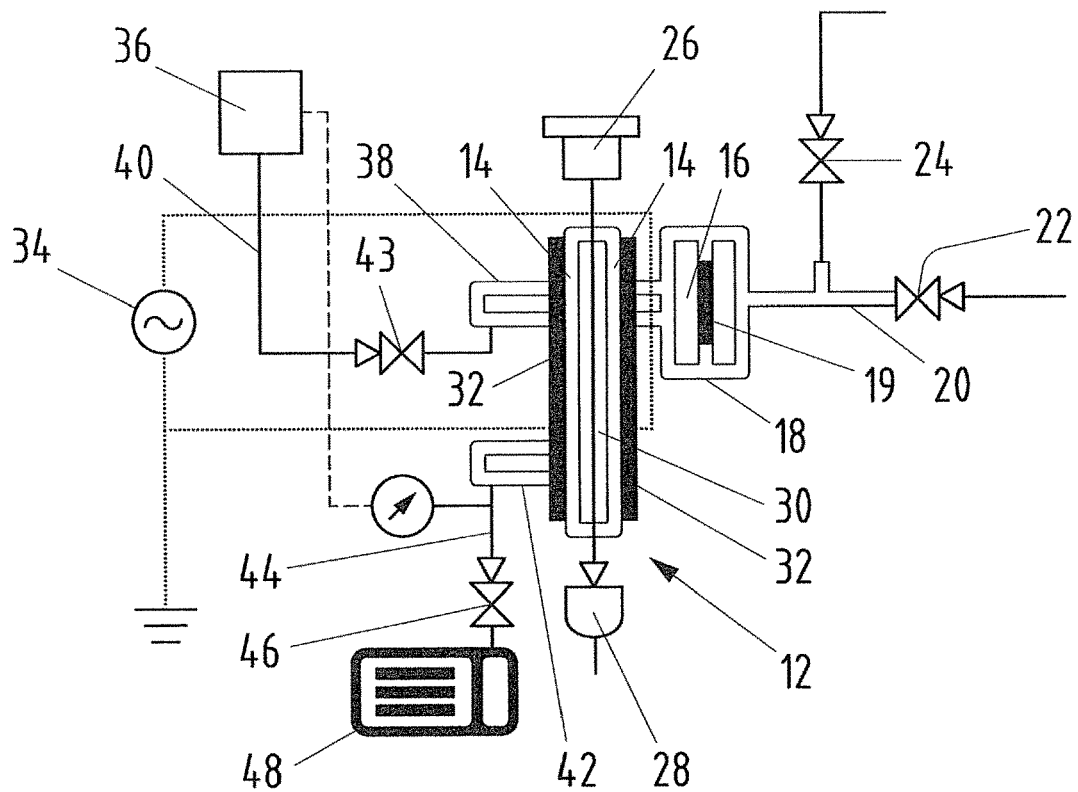
FIG. 1 shows a schematic view of a first embodiment.

In FIG. 1, the gas discharge cell 12 has cell walls 14 made of glass, forming a glass cell. The tracer gas inlet 16 carries an inlet housing 18 in which a tracer gas selective membrane 19 is housed. The tracer gas inlet 16 is further connected to a line 20 carrying a valve 22 connected to the tracer probe. The line 20 is connected to a further valve 24 connected to a calibrated leak for calibration purposes.

An optical spectrometer arrangement comprises a radiation source 26 in the form of a laser diode. The radiation source 26 is located at a first end of the discharge cell 12. On a second end opposite to the first end, a radiation detector (photo cell) 28 is located. Radiation emitted by the radiation source 26 enters the discharge cell, travels all the way through the discharge volume 30 surrounded by the cell walls 14, leaves the discharge cell at the opposite end and hits the radiation detector 28 where it is detected.

Two electrodes 32 are located on further opposing sides of the discharge cell 12. The electrodes are unexposed to the gas within the discharge cell 12 because the glass cell walls 14 are arranged between the electrode 32 and the discharge volume 30.

The electrodes 32 are provided with AC high voltage at a frequency in the kilohertz or MHz range provided by the voltage generator 34.

A buffer gas source 36 is connected to a buffer gas inlet 38 of the discharge cell 12 via a buffer inlet line 40 and a buffer inlet valve 43. The buffer gas entering the discharge volume 30 through the buffer gas inlet 38 flows through the discharge cell 12 and leaves the cell through the buffer gas outlet 42 at an end of the cell 12 close to the photo detector 28. From the buffer gas outlet 42, the buffer gas is lead through a buffer gas outlet line 44 and a buffer gas outlet valve 46 to a rotary vane pump 48 pumping the gas from the source 36 through the cell 12.

Figure 2:
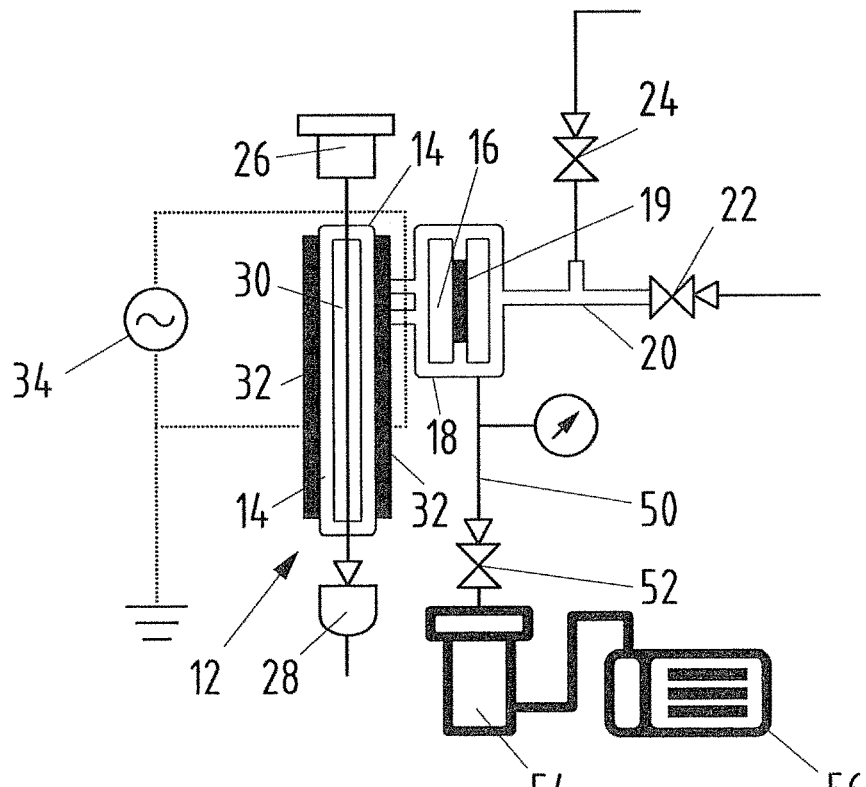
FIG. 2 shows a schematic view of a second embodiment.

The embodiment of FIG. 2 differs from the embodiment of FIG. 1 in that the discharge cell is a static cell without a buffer gas inlet and a buffer gas outlet.

Rather, the buffer gas is maintained within the discharge volume 30. The housing 18 of the tracer gas inlet 16 is connected via a vacuum line 50 and a valve 52 to a pump arrangement comprised of a turbo pump 44 and a diaphragm pump 46.

Figure 3:
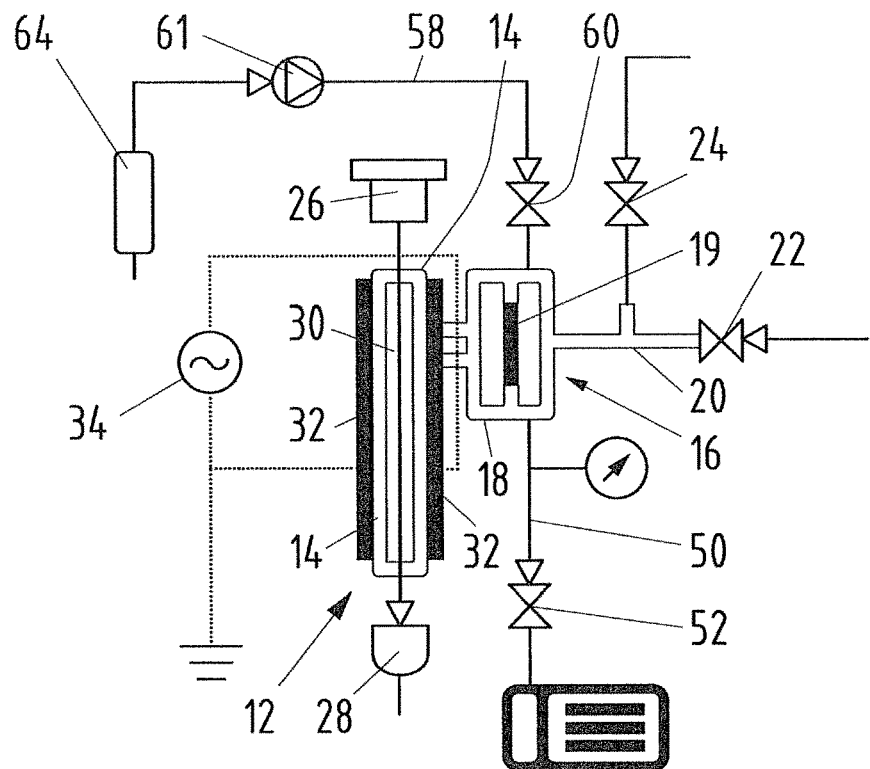
FIG. 3 shows a schematic view of a third embodiment.

The embodiment according to FIG. 3 differs from the embodiment according to FIG. 2 in that the vacuum line 50 and vacuum valve 52 are connected to a diaphragm pump only rather than to the pump system of FIG. 2. Further, the housing 18 of the gas inlet 16 is connected via a second vacuum line 58 and a second vacuum valve 60 to a source 62 of pumping gas which is pumped via a filter 64 through the second vacuum line 58, the second vacuum valve 60 and the housing 18 of the gas inlet and from their via the first vacuum line 50 and the first vacuum valve 52 to the diaphragm pump 56. The pumping gas is guided past the membrane 19 within the gas inlet housing 18.

Figure 4:
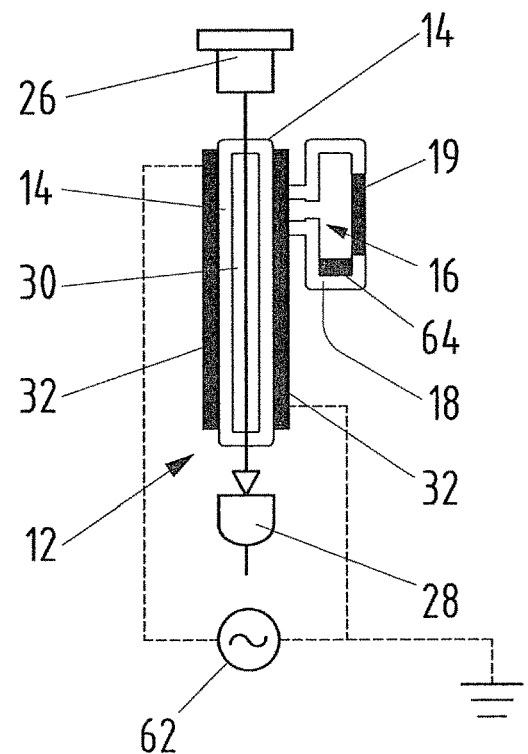
FIG. 4 shows a schematic view of a fourth embodiment.

The embodiment of FIG. 4 also has a static gas discharge cell 12 without a buffer gas inlet and buffer gas outlet. The electrodes 32 are electrically connected to a radio frequency power generator 62, supplying an AC voltage having a frequency in the megahertz range to the electrodes 32.

The gas discharge cell 12 contains a buffer gas mixture comprising ambient helium and neon, argon, nitrogen or oxygen. An excited state buffer gas mixture results from the radio frequency power supplied via the electrode 32.

Figure 6:
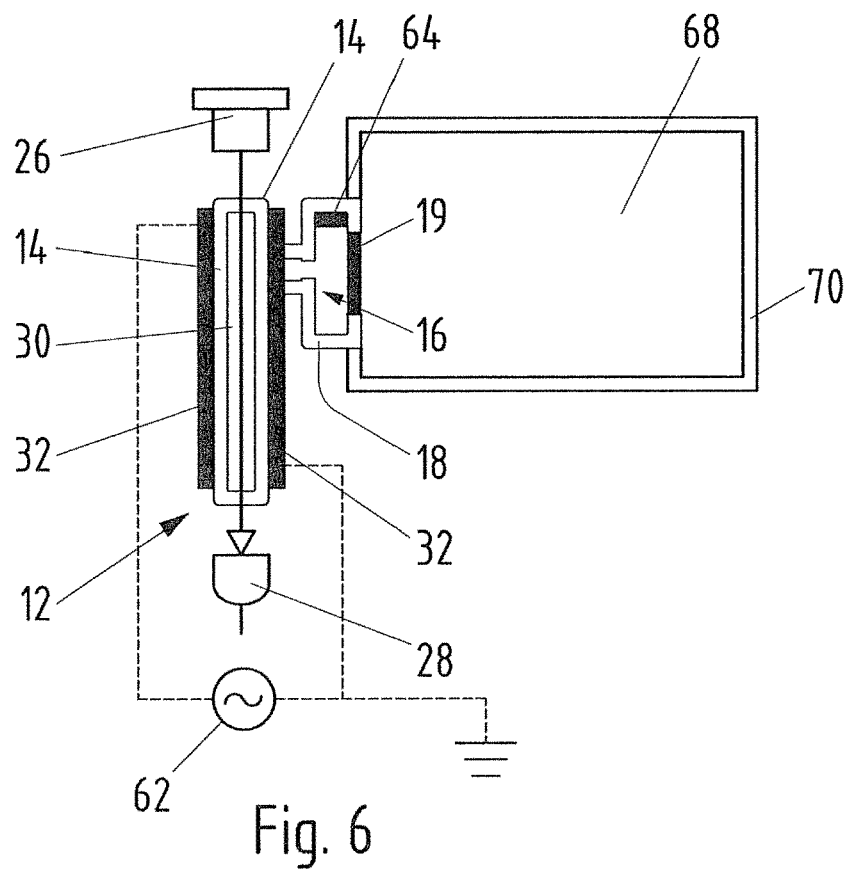
FIG. 6 shows a schematic view of a sixth embodiment.
Figure 7A:
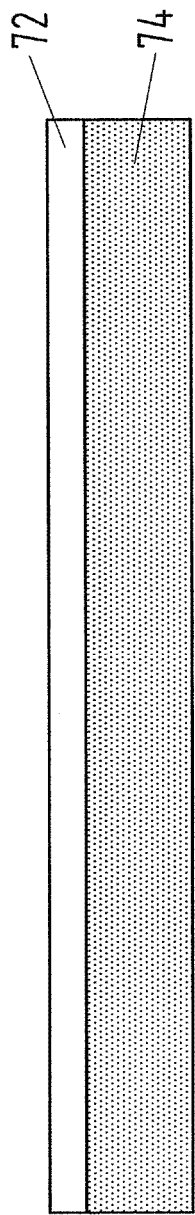
FIG. 7A shows a schematic view of an embodiment of the membrane arrangement.
Figure 7B:
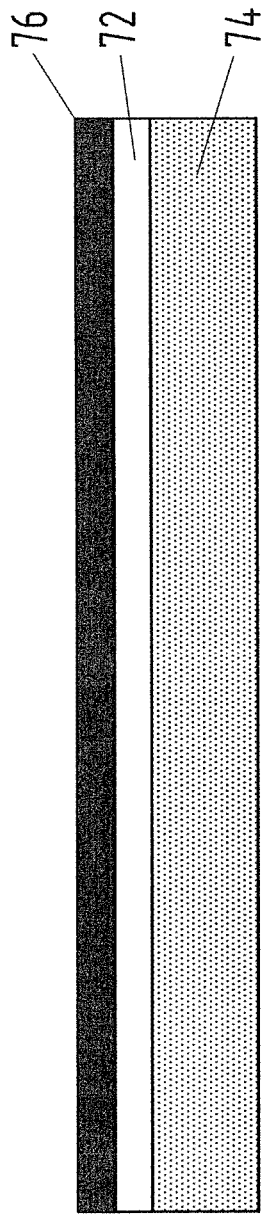
FIG. 7B shows a schematic view of an further embodiment of the membrane arrangement and FIG. 7C shows a schematic view of an even further embodiment of the membrane arrangement.
Figure 7C:
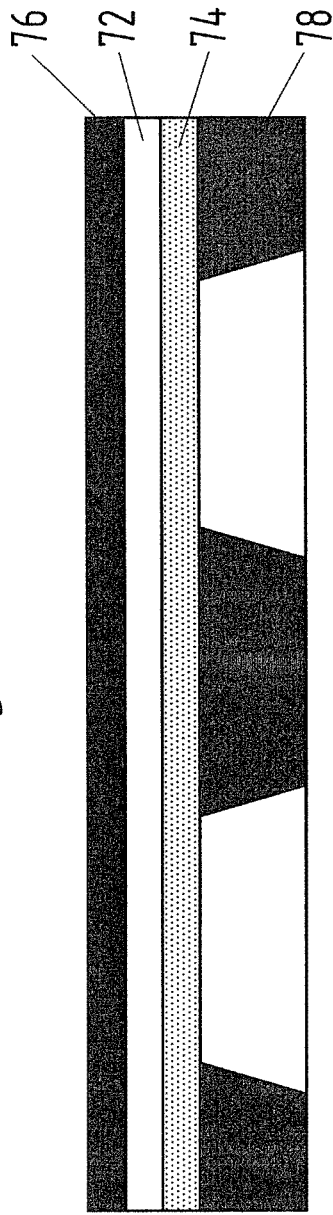

The gas inlet 16 of the gas discharge cell 12 carries a housing 18, an outer wall of which is formed by a membrane 19 having a heat activated thin section, examples of which are shown in further detail in FIGS. 7A, 7B and 7C. Like membranes are also employed in the embodiments of FIGS. 5 and 6. The housing 18 further comprises a hydrogen getter 64.

Figure 5:
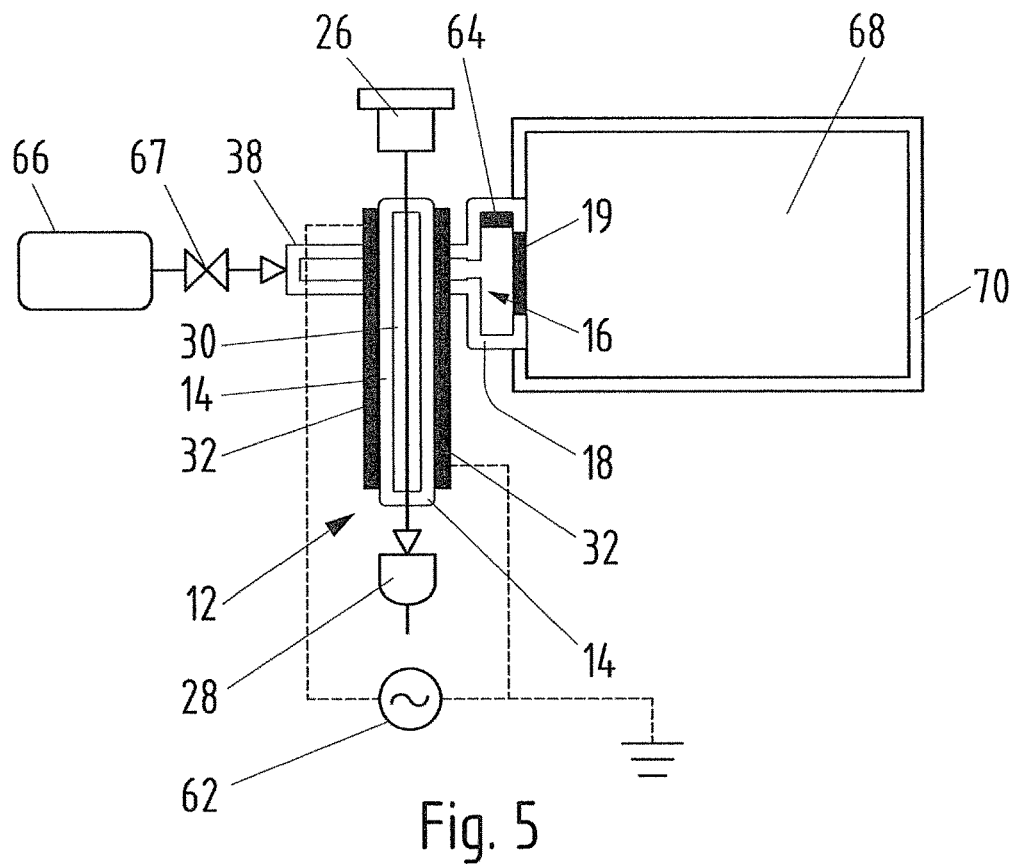
FIG. 5 shows a schematic view of a fifth embodiment.

The embodiment of FIG. 5 differs from the embodiment in FIG. 4 in that the gas discharge cell 12 comprises a buffer gas inlet 38 connected to a buffer gas refill container 66 via a refill valve 67. A buffer gas outlet is not provided. The buffer gas may be helium, hydrogen, neon, argon, nitrogen or oxygen.

A further difference over the embodiment of FIG. 4 is that the portion of the gas inlet housing 18 carrying the membrane 19 is connected to an evacuated test object 68 in the form of a vacuum chamber which is under leak test. The outside of the test object 68 may be sprayed with the tracer gas which enters into the test object 68 through a leak 70. Alternatively, ambient gases entering through the leak 70 may be employed as tracer gas. The tracer gas which has entered into the test object 68 enters the gas discharge cell 12 through the membrane 19 and the tracer gas inlet 16. The membrane 19 carries a heat activated thin section as described above with regard to FIG. 4 and as shown in further detail in FIGS. 7A-7C.

The embodiment of FIG. 6 differs from the embodiment of FIG. 5 in that the gas discharge cell 12 has no buffer gas inlet 38 connected to a buffer gas container. Rather, the discharge cell 12 is prefilled with the buffer gas which may be argon, nitrogen or oxygen, being excited within the discharge cell 12. The electrodes 32 are also powered by radio frequency AC voltage in the megahertz range supplied by the RF power generator 62.

FIGS. 7A, 7B and 7C each show embodiments of the membranes 19 employed in FIGS. 4, 5 and 6, each having a heat activated thin section. In FIG. 7A, a thermally densified spin-on-glass film 72 having a thickness in the range of 30-200 nm is coated onto a porous support 74. In FIG. 7B, an additional borophosphosilicate glass layer 76 is coated onto the spin-on-glass film 72 via chemical vapor deposition.

In the embodiment in FIG. 7C, the porous support layer 74 carrying a spin-on-glass layer 72 and a borophosphosilicate glass layer 76 on top of the layer 72 is coated onto a support structure 78. The porous support layer 74 may be a spin-on-glass layer doped with tin and platinum (for example) having a pore size in the range of 3-70 nm.

Figure 8:
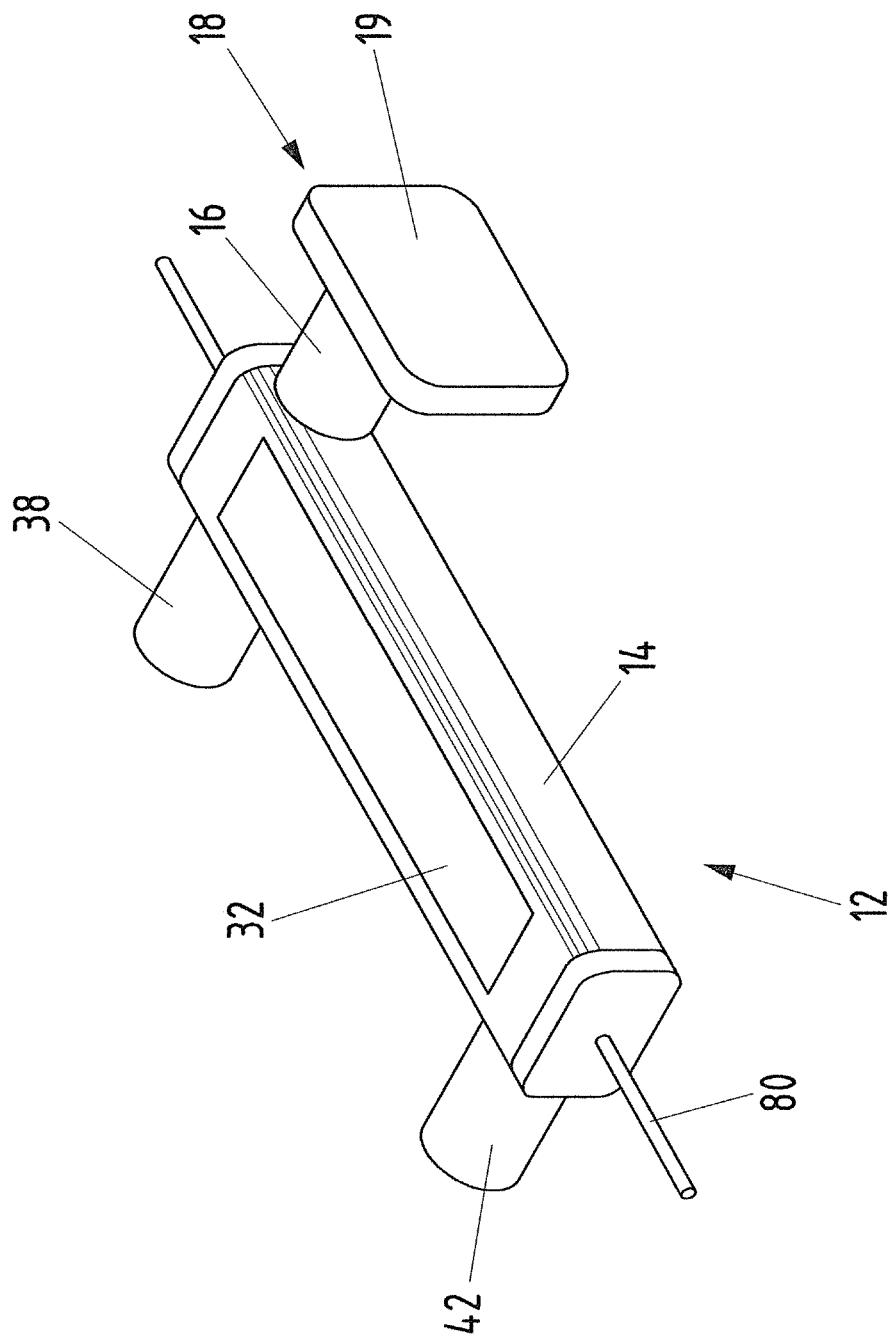
FIG. 8 shows a perspective view of an embodiment.

FIG. 8 shows a perspective view of the discharge cell 12 in FIG. 1. The discharge cell 12 is arranged as a one path cell, i.e. a single laser beam 80 is guided through the cell from the radiation source 26 to the photo detector 28. The length of the electrode is 50 mm and the cross section of the cells outer dimensions in a plain lateral to the direction of the laser beam 80 has a width of 3 mm and a height of 2 mm.

Figure 9:
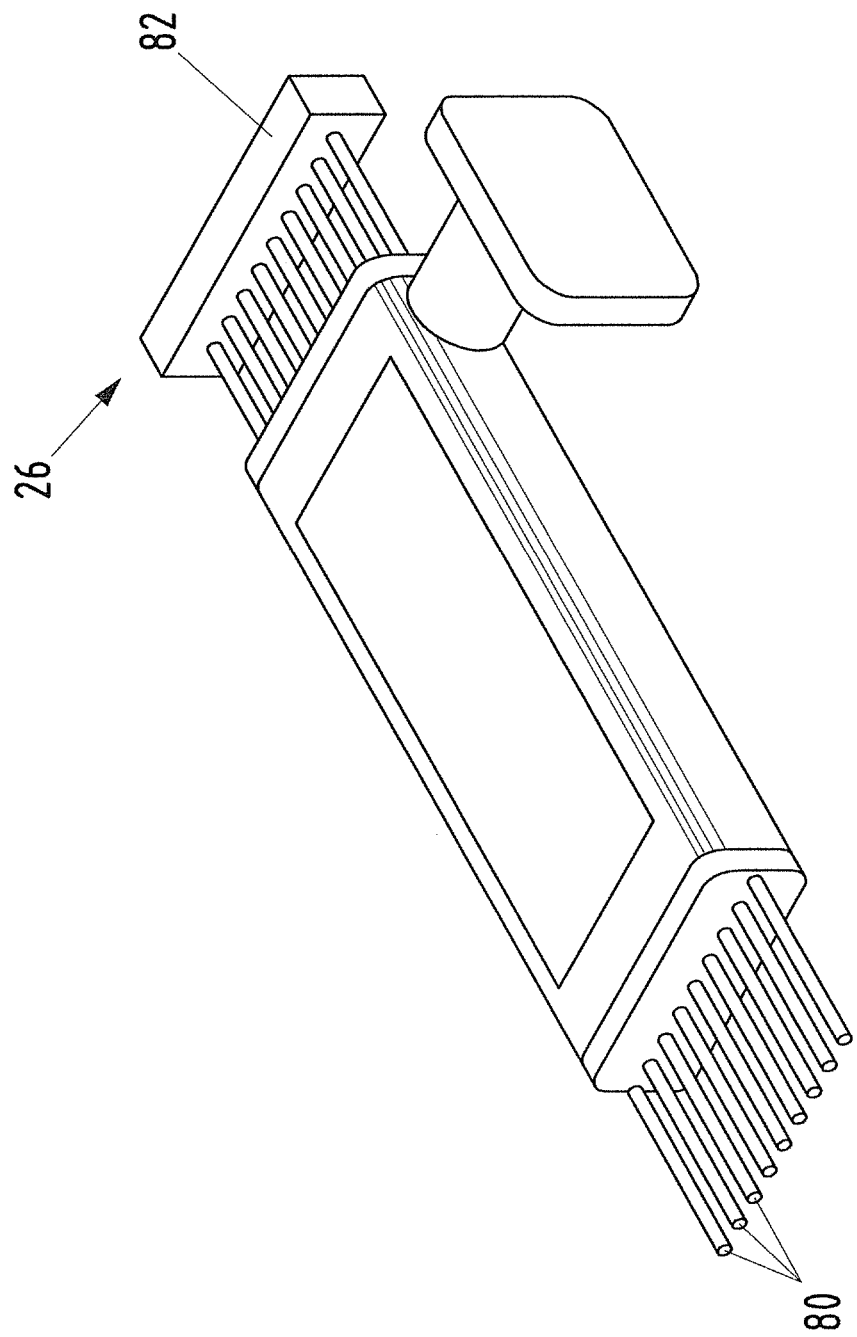
FIG. 9 shows a perspective view of another embodiment and FIG. 10 shows a perspective view of an even further embodiment.

FIG. 9 shows an embodiment in which the discharge cell 12 is arranged to be a 10 path cell, i.e. 10 laser beams 80 are guided through the cell 12 in parallel. A mirror 82 may reflect the radiation beams 80. The mirror 82 may be considered a radiation source at an end of the cell opposite to the photo detector which is not shown in FIG. 9. The width of the cell in FIG. 9 is 15 mm rather than 3 mm in FIG. 8.

Figure 10:
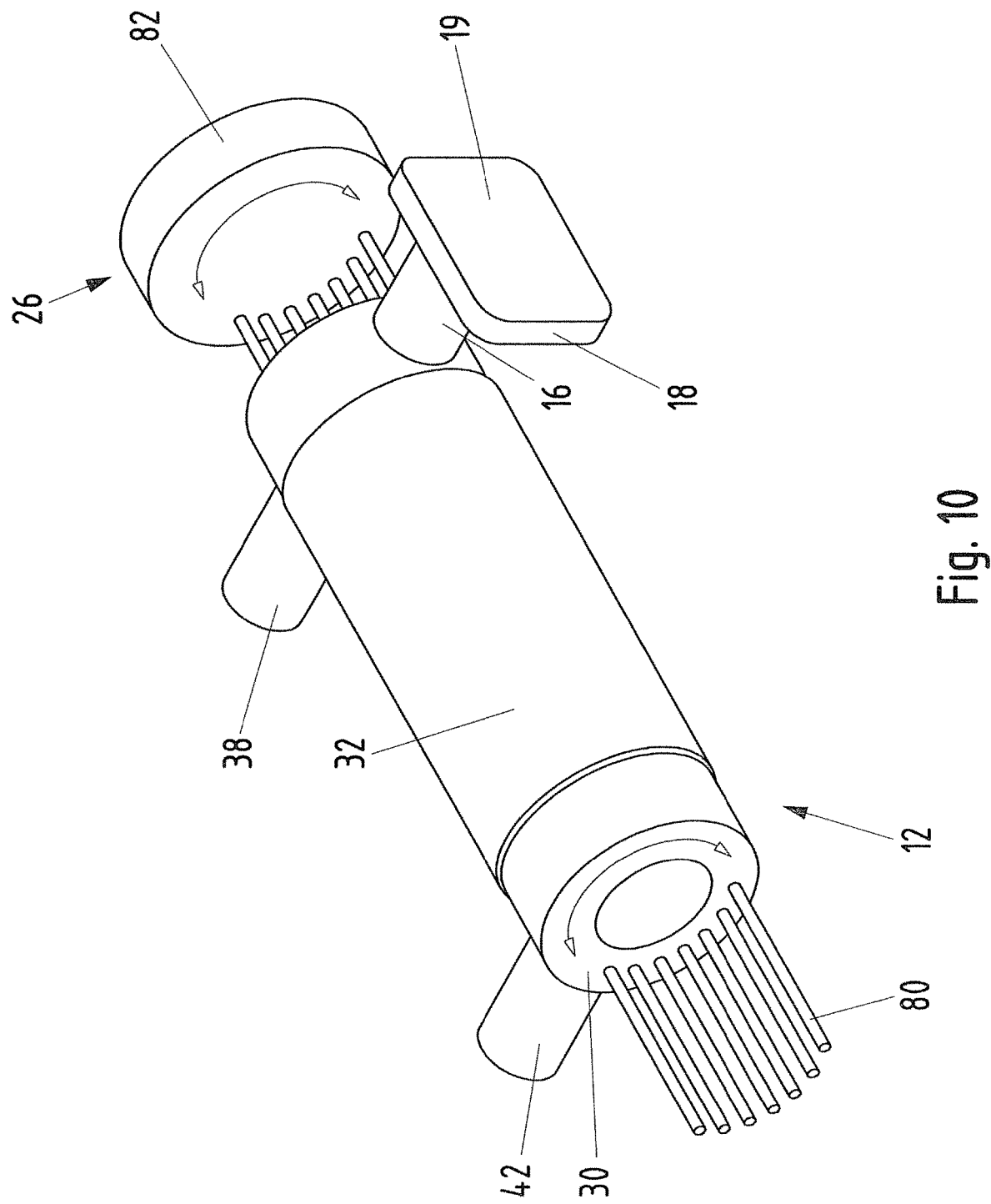

FIG. 10 shows a 100 path cell in which the gas discharge cell 12 is formed as a cube surrounded by a tubular electrode 32 entirely surrounding the cell 12. The cross section of the gas discharge volume 30 is ring-shaped.

The invention claimed is:

1. A tracer gas sensing device comprising:
a gas discharge cell having cell walls defining a discharge volume and a tracer gas inlet into the discharge volume, wherein the tracer gas inlet comprises a gas selective membrane comprising a layer of thermally densified spin-on glass dielectric;
an optical spectrometer arrangement having a radiation source on a first side of the gas discharge cell for emitting light into the gas discharge cell and a radiation detector on a second side of the gas discharge cell opposite to the first side for detecting radiation that is emitted by the radiation source through the discharge volume; and
electrodes on opposing sides of the gas discharge cell for generating a plasma within the gas discharge cell, said electrodes being unexposed plasma electrodes.

2. The tracer gas sensing device according to claim 1, wherein an electrically insulating material is provided between each electrode and the discharge volume.

3. The tracer gas sensing device according to claim 2, wherein each electrode is covered by said electrically insulating material.

4. The tracer gas sensing device according to claim 2, wherein the electrically insulating material is a portion of a cell wall of the gas discharge cell.

5. The tracer gas sensing device according to claim 1, wherein the gas discharge cell is a dielectric barrier discharge cell.

6. The tracer gas sensing device according to claim 1, wherein the electrodes are powered by an AC power source.

7. The tracer gas sensing device according to claim 1, wherein the discharge volume comprises a buffer gas.

8. The tracer gas sensing device according to claim 7, wherein the buffer gas comprises argon.

9. The tracer gas sensing device according to claim 1, wherein the gas discharge cell comprises a buffer gas inlet and a buffer gas outlet.

10. The tracer gas sensing device according to claim 1, wherein the discharge volume has a cross-sectional width of less than 10 mm in a plane lateral with regard to a direction of radiation traveling from the radiation source to the radiation detector.

11. The tracer gas sensing device according to claim 1, wherein the layer of thermally densified spin-on glass dielectric is leveled and/or capped with a thermally re-flown layer of chemical vapor deposition borophosphosilicate glass.

12. The tracer gas sensing device according to claim 1, wherein an inner surface of at least a portion of the cell walls of the gas discharge cell comprises a dielectric material.

13. The tracer gas sensing device according to claim 1, wherein electrons of the gas discharge cell are excited by a high frequency source.

14. The tracer gas sensing device according to claim 1, further comprising at least a further radiation source.

15. A method for separating a gas component from a gas, by employing a spin-on glass wafer as a gas selective membrane for separating the gas component.

16. The method according to claim 15, wherein the spin-on glass wafer is a silica oxide semiconductor.

17. The method according to claim 15, wherein the spin-on glass wafer comprises a layer of thermally densified spin-on glass dielectric.

* * * * *